Sept. 23, 1969  A. RYDEN  3,469,240
COMPUTER FOR RECORDATION OF A CREDIT TRANSACTION
Filed April 19, 1966  4 Sheets-Sheet 1

Sept. 23, 1969          A. RYDEN          3,469,240

COMPUTER FOR RECORDATION OF A CREDIT TRANSACTION

Filed April 19, 1966          4 Sheets-Sheet 2

Sept. 23, 1969     A. RYDEN     3,469,240

COMPUTER FOR RECORDATION OF A CREDIT TRANSACTION

Filed April 19, 1966     4 Sheets-Sheet 4

United States Patent Office 3,469,240
Patented Sept. 23, 1969

3,469,240
COMPUTER FOR RECORDATION OF A CREDIT
TRANSACTION
Arthur Ryden, McKeesport, Pa., assignor to Philip R.
Dutch, Pittsburgh, Pa.
Filed Apr. 19, 1966, Ser. No. 543,670
Int. Cl. G11b 13/00
U.S. Cl. 340—172.5　　　　　　　　　　　　　　6 Claims

ABSTRACT OF THE DISCLOSURE

A system is disclosed for recording a complete credit transaction in a gasoline station in binary code on a tape. The identification of the purchaser is on a punched card and the data of the transaction is set on code wheels. The card has two rows of hole positions only one hole in each position being punched. After the card is checked for credit integrity by comparison with pairs of hole positions on a tape, having complementary punching, to identify bad credit risks, the data of the complete transaction is converted into a binary electrical signal having one frequency for 0 and another frequency for 1 and recorded on the tape.

---

This invention relates to the computer art and has particular relationship to computers for handling a credit transaction.

Present credit transactions of such institutions as gasoline distributors, such as oil companies which operate through gasoline stations, are highly complex, time-consuming and costly. The credit customer has an identifying card with which the station attendant produces an impression on a ticket on which he writes the data of the transaction, usually including the date, the quantity of each item bought, the unit price and cost of each item and the total cost. The customer receives a copy of the ticket; the original is sent to the distributor. The distributor provides the station with a list of bad credit risks but often the attendant does not check this list, or if he checks it, he frequently overlooks an identification on the list. In addition the recording of data and the billing from the cards is costly and time-consuming.

It is an object of this invention to overcome the above disadvantages and to provide a simple, low cost, system for carrying out a credit transaction in whose operation bad credit risks shall be readily automatically detectable and whose recording and billing shall be readily carried out. Another object of this invention is to provide such a system which shall check for defective cards. An incidental object of this invention is to provide apparatus for checking the integrity of a credit card of the punched type. Another incidental object of this invention is to provide a novel code disc particularly adapted to the practice of this invention but having other uses. A further incidental object of this invention is to provide a novel recording mechanism particularly adaptable to the practice of this invention but having other uses. A still further incidental object of this invention is to provide a novel switch mechanism for an identification card which shall be particularly adaptable to the practice of this invention but shall have other uses.

In accordance with this invention apparatus is provided for recording data of a credit transaction in which the data is recorded on a tape capable of carrying the intelligence of the data and of being subsequently reproduced so that the data may be transferred to the necessary ledgers and invoices. Typically this invention may be applied to the accounting procedures of oil companies or gasoline distributors. In this case the driver who delivers the gasoline may deliver cartridges of blank tape to the station and carry back to headquarters cartridges containing tape on which data has been recorded since the driver's last visit. In addition, the driver delivers a cartridge with a tape including impressions identifying bad credit risks and takes back with him the corresponding tape delivered during the last visit.

In the practice of this invention the credit card includes a plurality of pairs of impressions or positions which typically may be aligned. Each pair of impressions or positions corresponds to a digit of the binary number system. One impression of each pair is punched; a pair with one identified impression punched corresponds to 0 and a pair with the other punched corresponds to a 1. The name and address of the credit customer owning the card may be determined from the number defined by the impressions or certain impressions may identify the name while the others identify the address. The only cards which are correct are those on which one and only one of the holes of each pair is punched.

The apparatus according to this invention includes a recording machine by operation of which the record of each transaction is recorded on the tape in the cartridge supplied by the driver. The machine includes a receptacle for receiving and checking the card and also facilities for recording the other data of the transaction including number, and type, of units, unit price, total cost, and date. The receptacle includes a plurality of switch mechanisms, one corresponding to each pair of impressions, which is connected to block recording of the data unless each pair has one and only one, punched hole.

The facilities for recording the other data includes a plurality of code discs each having a plurality of sets of conducting points. A pair of conductors is associated with each set. Different electrical signals are impressed on the two conductors, one signal being identified as a 0 signal and the other as a 1. The sets of points are connected to the conductors so that the individual signals which they carry correspond to the numbers 0 through 9 in the binary system. A plurality of brushes are associated with each code disc. The brushes are connected to a selected set of points in any setting of the disc and transmit the signals corresponding to the setting to a record head which records the signals on a tape, in effect impressing a number from 0 through 9 on the tape. For example, there may be four points in each set each corresponding to a digit in the binary system. If the number 4 is to be transmitted, the points corresponding to the first, second and fourth digits are connected to the 0 signal conductor and the remaining point to the 1 conductor. The brushes then transmit signal 0100 or 4.

There are as many code discs as there are numbers to transmit. Typically, in situations in which all the data is printed out, the date requires two for month, two for day in month, and one for year (assuming a ten year period); the type of product requires one disc, the number of units, two, the price per unit, three, the tax, one, the total cost of each unit, three for oil, three for antifreeze solutions, and four for gasoline. The discs are set in accordance with the purchase after the card is inserted. The apparatus includes a printing mechanism for printing on paper the data on the card and code discs. Typically, the data is printed in duplicate and the duplicates are signed by the customer. Since the data in the discs is thus verified it may be advantageous to reduce the data on the discs only to the date and total price and the apparatus may thus be materially simplified.

The apparatus includes facilities for checking the credit risk of the card. These facilities include a tape having one pair of impressions corresponding to those on the card with one, and only one, impression of each pair perforated. For any bad-credit card the perforation of the pairs of holes is complementary to the perforation on the card; that is, the unperforated impressions on the card correspond to perforated holes on the tape and the perforated holes on the card correspond to unperforated holes on the tape. The tape is scanned by brushes, photoelectric means or the like, and when pairs of impressions on a card and the tape are complementary to each other a signal is displayed indicating a bad-credit card, or the recording machine may be stopped.

The information on the card and the code discs is transferred to a set of contacts which are scanned successively by a brush. The intelligence on each contact in its turn is recorded on a tape. This intelligence is transferred through a second set of contacts which are scanned in synchronism with the first set. The second set serves to check the first set. Each pair of contacts of the first and second set is connected in series to an indicating mechanism which produces a signal if either contact of the set fails to conduct, for example, by reason of dirt or corrosion.

For a better understanding of this invention, both as to its organization and as to its method of operation, together with additional advantages and objects thereof, reference is made to the following description, taken in connection with the accompanying drawings; in which.

Figure 1:
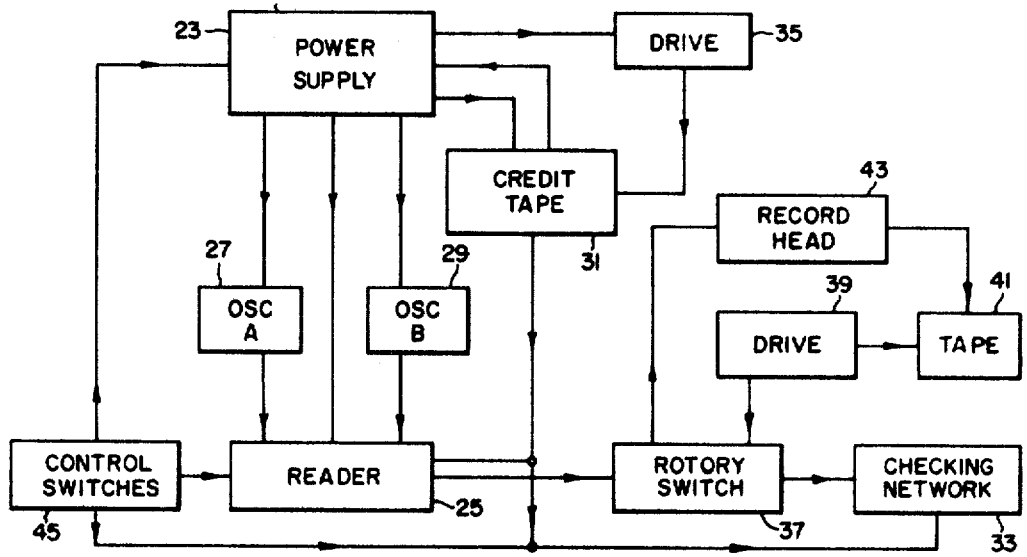
FIG. 1 is a block diagram showing an embodiment of this invention.
Figure 9A:
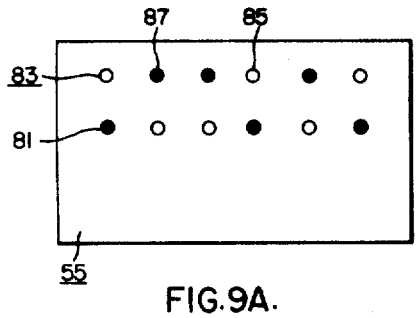
Figure 9B:
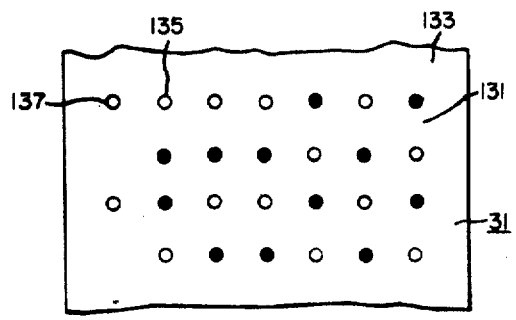

The apparatus shown in the drawings includes a recording machine having a cabinet 21 within which are mounted, and appropriately connected, the devices shown in FIG. 1. These devices include a power supply 23 (FIG. 1) which may be a facility for connecting to the buses of a commercial supply, and may, where necessary include rectifiers (not shown) to supply direct current. The supply energizes the other devices which include a reader 25 (see also FIG. 4) for reading the intelligence on the card and of a transaction. In the practice of this invention specifically disclosed the binary number system is used and the binary identifications are signals of separately-identifiable frequencies produced by oscillators 27 and 29. Oscillator 27 produces a frequency A which identifies 0 and oscillator 29, a frequency B which identifies 1. The apparatus includes a credit tape 31 (see also FIG. 9B which is compared with the card in the reader 25 and which acts on a checking network 33 to produce a signal for a bad-credit card. The tape 31 is advanced by a drive 35 which is automatically stopped at the end of one cycle for each card. The apparatus includes a rotary switch 37 (see also FIG. 7) on which the intelligence is impressed item by item in terms of frequencies A and B and a drive 39 for rotating the switch 37 and advancing the tape 41 (FIG. 4) on which the transaction is recorded. The data is recorded by a record head 43. The apparatus includes switches 45 for controlling and resetting the apparatus.

Figure 2:
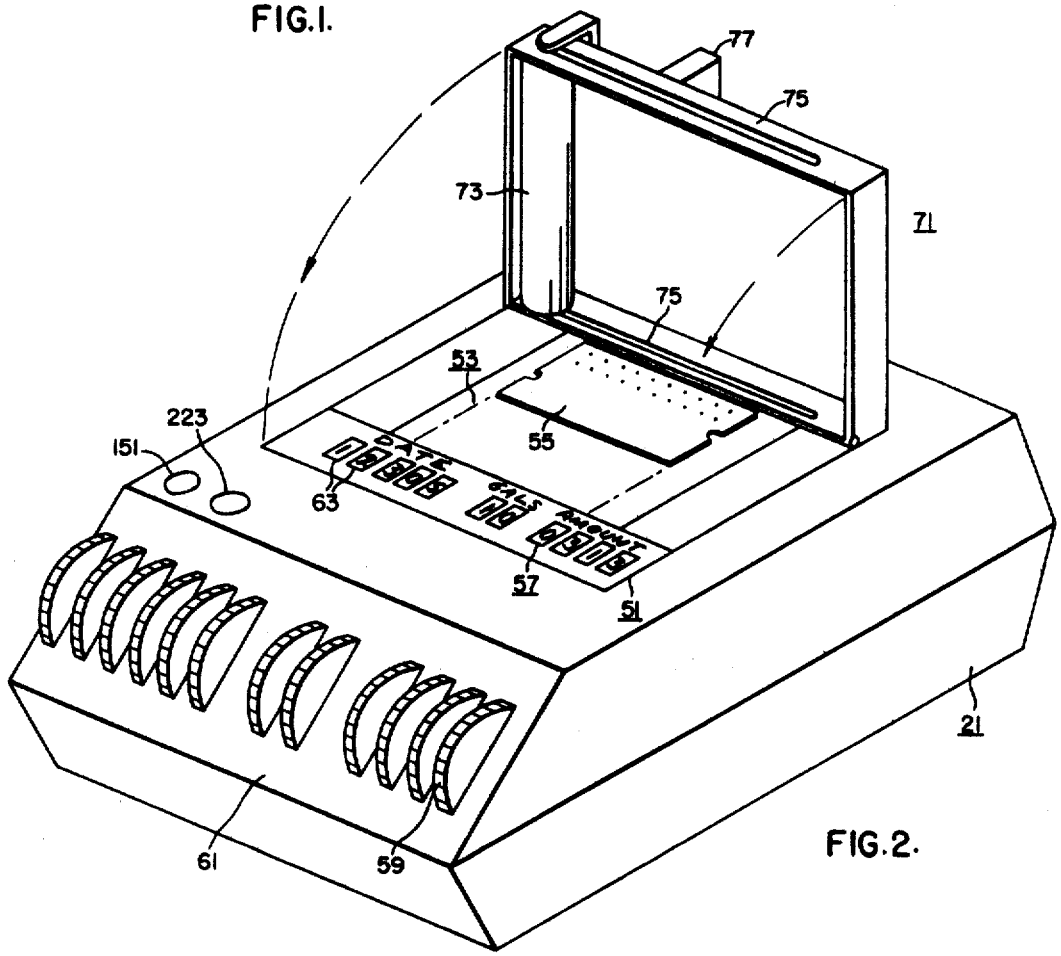
FIG. 2 is a view in perspective showing a recording machine embodying this invention.
Figure 6:
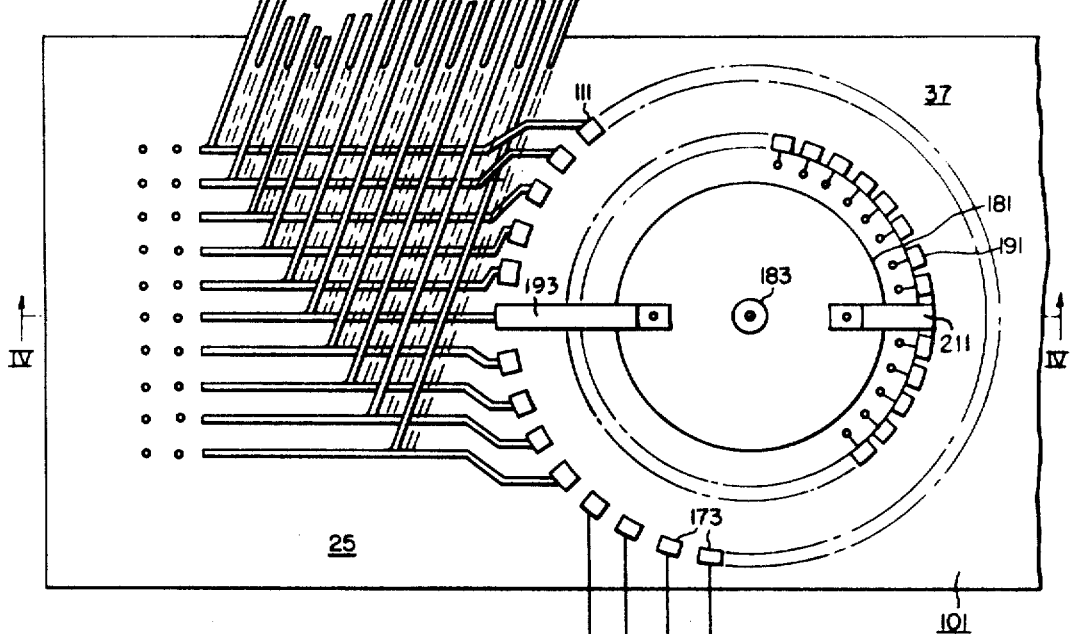
FIG. 6 is a plan view of a code disc according to this invention.
Figure 6:
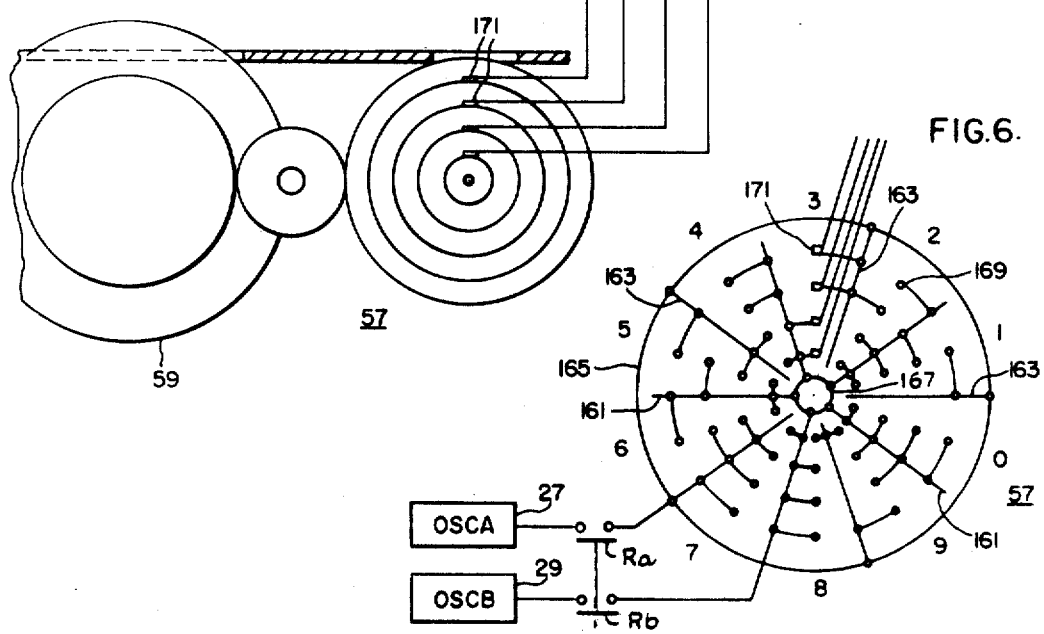

The recording machine (FIG. 2) also includes a panel 51 having a receptacle 53 for credit cards 55. Within the cabinet 21 under the panel 51 the code wheels 57 (see also FIG. 6) for setting the intelligence are rotatably mounted. Each code wheel 57 may be set by a knurled wheel 59 extending through an inclined surface 61 of the cabinet 21. Each code wheel 57 has on its periphery a plurality of embossed numbers 63, each number identifying a setting. With the code wheel in any setting the embossed number identifying the setting protrudes through the panel 51.

A printing mechanism 71 is hingedly mounted at one end of the panel 51. The mechanism 71 may be latched in the vertical position shown and may be manually unlatched from this position and set into printing relationship with the panel 51. The mechanism 71 includes an inked roll 73 movable rollably in a slot 75 by a handle 77 across the panel 51. In the practice of this invention paper in duplicate, for example NCR paper, is placed over the panel; the mechanism 73 is set over the panel and the roll 73 is swept over the paper printing the transaction on the paper.

Figure 3:
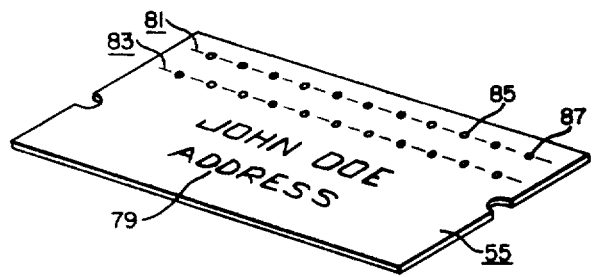
FIG. 3 is a view in perspective of a credit card used in the practice of this invention.

The card 55 (FIG. 3) used in the practice of this invention includes the name and address 79 of the credit customer. This intelligence 79 is embossed so that it is printed by the mechanism 71. In addition the card 55 includes pairs of impressions 81 and 83 which are aligned. The impression of each pair 81 and 83 includes a plurality of positions which may be punched holes 85 or not punched. The unpunched positions are shown as filled in circles 87 but in actual practice may be blanks. In referring to unperforated impressions herein it is intended to include unpunched blanks where such blanks occur. Corresponding positions on card 55 have one, and only one, hole.

The punched impressions may identify a 1 and the unpunched impressions a zero. The card 55 has 11 positions and this permits the setting of numbers from 0 up to two to the eleventh power or 2048. This is for illustrative purposes only; in actual practice there are as many as 20 or more positions.

The card reader 25 includes a plurality of switches 91 (FIG. 4, 5) one each for each position on the card 55. Each switch includes a pair of pins 93 and 95 extending from a resilient or skewing arm 97 and 99 respectively anchored to a printed circuit board 101 under the receptacle 53 (FIG. 2) in which the card 55 is inserted. The receptacle 53 has holes 103 and 105 through which the pins 93 and 95 extend.

Figure 5:
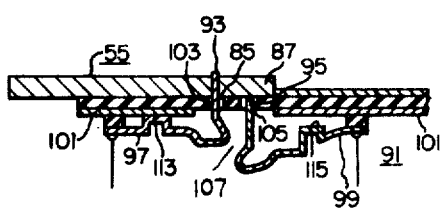
FIG. 5 is a view in side elevation of a card checking switch according to this invention.
Figure 4:
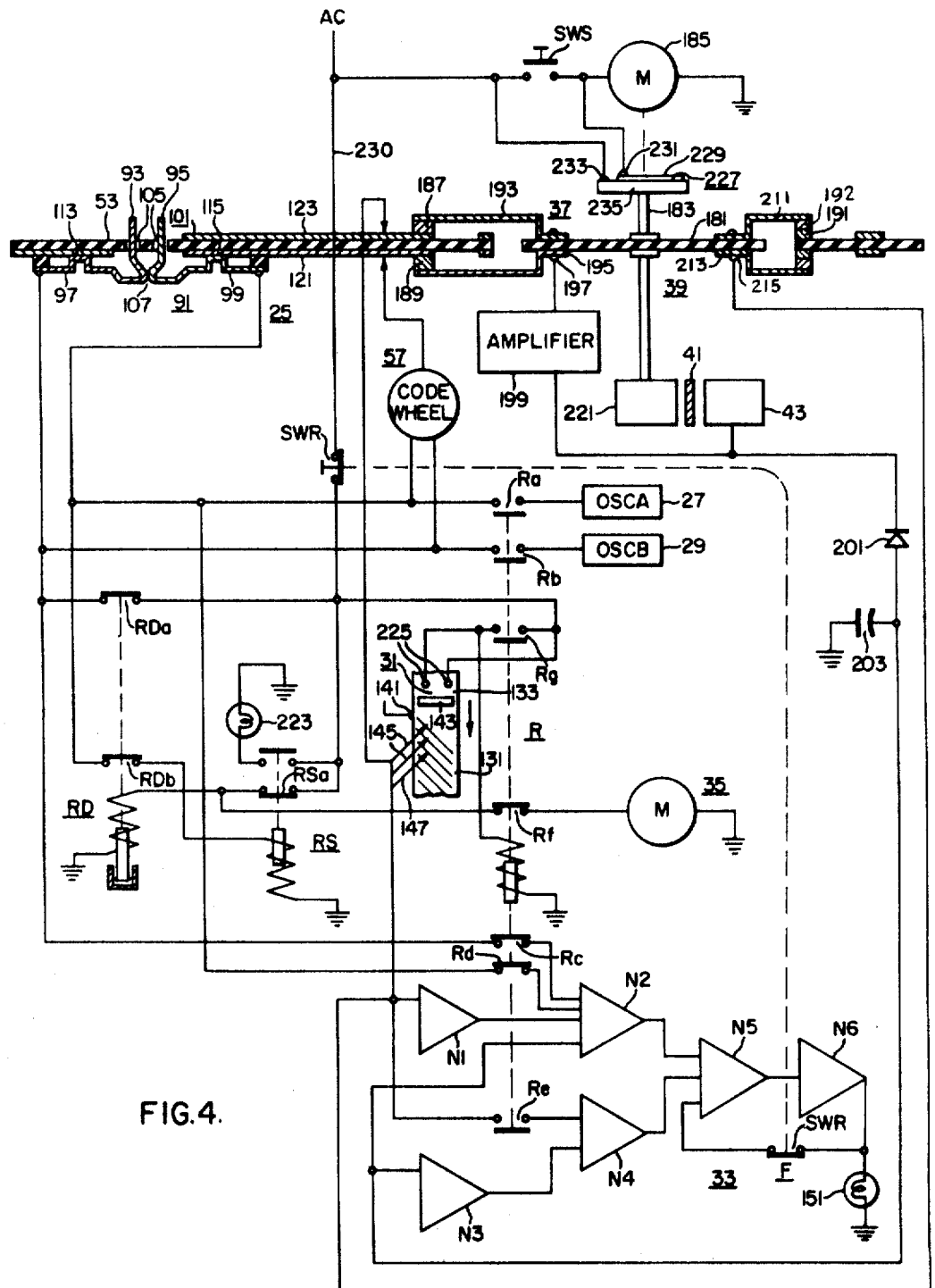
FIG. 4 is a view, partly diagrammatic and partly schematic, of the electrical circuit of the apparatus shown in FIG. 1.

In the normal setting of the switch 91 the arms 97 and 99 are in electrically conducting contact in region 107 (FIGS. 4, 5). When a card is inserted in the receptacle 53 one or the other of the pins, 93, or 95, is depressed at each unperforated impression (87) and the contacts at region 107 are broken for the corresponding springs (FIG. 5). If the card has two holes or no holes in any position both springs for this position penetrate or are depressed and contact 107 is maintained. This indicates a faulty card.

Figure 7:
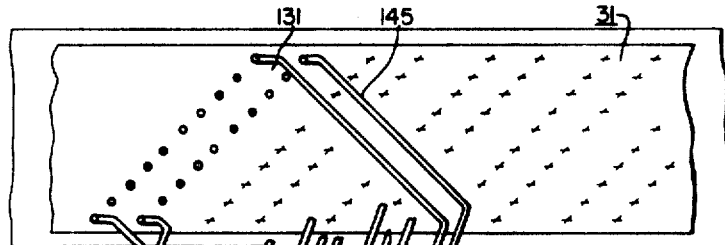
FIG. 7 is a fragmentary view showing the interconnection of a code disc, the credit checking tape, and the checking synchronous brush and contacts according to this invention.

The printed circuit board 101 carries a plurality of separate conducting areas or contacts 111 insulated from each other (FIG. 7). Each switch arm 97 and 99 has a brush 113 and 115 respectively which conductively engages a corresponding area 111 in the undepressed position of the arm. Oscillator 27 is adapted to be connected to arm 99 through the contacts $R_a$ of a relay R (FIG. 4) and oscillator 29 is adapted to be connected to the other arm through the contact $R_b$ of the relay R. With arm 97 depressed a 0 signal is impressed on board 101, and with arm 99 depressed a 1 signal is impressed on board 101.

The printed circuit board 101 (FIG. 7) is composed of upper and lower strips 121 and 123 (FIG. 4) respectively both carrying conducting areas 111. The 0 conducting areas may be on the lower strip 121 and the 1 areas on the upper strip 123. The 1 areas on the upper strip 123 are connected to conductor (not shown) passing through the extensions of the receptacle 53.

Figure 8:
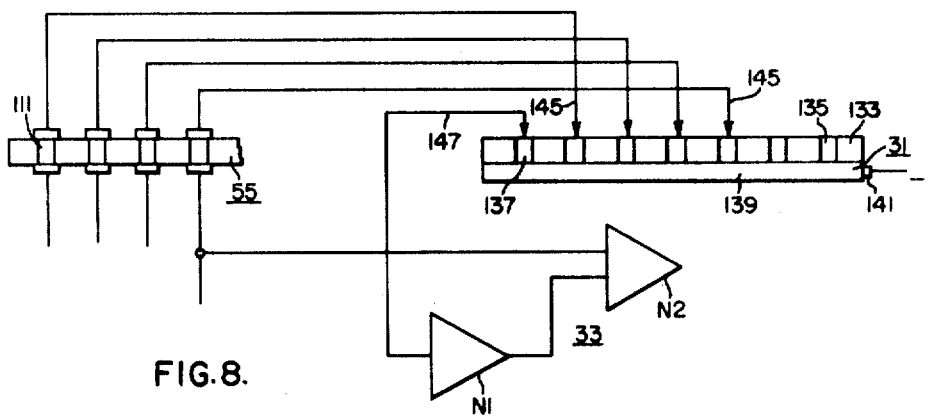
FIGS. 8, 9 and 9a are fragmental views, enlarged, showing the manner in which the credit card is checked against the bad-credit tape.

The bad-credit tape 31 (FIGS. 4, 8, 9B) is a continuous tape including an insulating web 133 having impressed thereon a plurality of pairs of impressions 131 corresponding to the impressions on the cerdit cards but complementary to those on the cards which are held by people having bad credit. The pairs of impressions 131 have holes 135 at positions corresponding to those on the bad-credit cards which are unperforated and these pairs of impressions 131 are unperforated at positions corresponding to those on the bad credit cards which are perforated. The web 133 also has a perforation 137 on one side which marks each pair of impressions 131. The tape 31 also has a conducting web or coating 139 backing the insulating web. Potential (negative) is applied to this backing 139 by a brush 141 (FIG. 8). At one end the web 133 has a conducting strip 143 (FIG. 4) which serves to stop the tape 31 after it has completed one cycle for each card.

A plurality of brushes 145 (FIGS. 4 and 8) are in engagement with the tape. There is a brush 145 for each position of the impression 131 and a sync brush 147 for the holes 137. The sync brush 147 is connected through each hole 137 to the conducting backing 139 and serves to interrogate each impression 131.

The checking network includes NOR's N1, N2, N3 and N4 (FIGS. 4, 8) and a flip-flop F including NOR's N5 and N6. The sync brush 147 is connected as an input to N1. The arms 97 and 99 are respectively connected to inputs to N2 through back contacts Rc and Rd of relay R.

During the sync instant, N1 has an input and its output is zero. In the event that the card 55 has good credit, potentials are impressed at the sync instants to the inputs of N2 from tapes 31, through holes 135, brushes 145, contacts 111 and pins 93 or 95. N2 then has a 0 at its output. This 0 appears at an input of N5 producing a 1 at its output and a 0 at the output of N6 so that the indicator 151 is deenergized. If a set of impressions 131 on the tape 31 are complementary to a set on a card, the circuit connecting 139 to the inputs of N2 is interrupted at the unperforated positions of the card and tape and there is a 0 at the input of N2, a 1 at its output, a 0 at the output of N5 and a 1 at the output of N6 so that the indicator 151 is energized.

Each code disc 57 (FIG. 6) is a circular disc of insulating material whose surface is divided up into ten sectors by alternate conductors 161 and 163. Conductors 163 are connected to a common conductor 165 near the periphery of the disc and conductors 161, to a common conductor 167 near the center of the disc. Ring 165 is adapted to be connected to oscillator 27 through contact Ra and ring 167 is adapted to be connected to oscillator 29 through contact Rb. Each sector has a plurality of conducting points 169. These points 169 are so connected to conductors 161 and 163, that with frequency A, 1 and frequency B, 0, the conducting points in the sector define successive numbers. Thus in the 0 sector all points are connected to conductor 161, in the 1 sector, the first point is connected to conductor 163 and others to conductor 161, and so on. A plurality of brushes 171 (FIGS. 6, 7) corresponding to the conducting points 169 are associated with each disc 57 and are disposed to engage the points 169 in any selected position of each disc 57. These brushes transmit the oscillator signals on the points 169 to contacts 173 on the printed-circuit board 101.

Each code wheel 57 has embossed numbers 63 on its periphery. A number 63 corresponding to the sector where the brushes 171 are engaged extends through the panel 51 (FIG. 2) in each position of each code wheel.

The rotating transfer switch 37 (FIGS. 4, 7) includes a disc 181 rotatable on a shaft 183 driven by a motor 185. The disc 181 carries brushes 187, 189 which are attached to arm 193. The contacts 111 and 173 are mounted in a circular arc around the shaft 183 and the brushes 187 and 189 sequentially engage the contacts 111 and 173. In addition another set of contacts 191 are mounted in an arc around the shaft 183 and these are engaged by the brush 192. On these contacts 191 a negative voltage is impressed. This negative voltage appears at NOR's N1 and N4 (FIG. 4) during the recording of the data on the discs 57 to convert the out at N2 and N4 to zero and condition flip-flop N5, N6 to respond to the signals through Rc, Rd and 43.

The contacts 111 may be engaged in pairs by the brushes 187 and 189 but in each case the pairs must be such that only one of the engaged contacts is connected to an oscillator 27 or 29. The contacts 173 must be mounted to be engaged individually.

The contacts 187 and 189 are connected to the disc 181 through a conducting arm 193. The arm 193 terminates in a brush 195 (FIG. 4) engaged by a conducting ring 197 which transmits the signals on the contacts 111 and 173 through an amplifier 199 to the secondary head 43. The output of the amplifier 199 is also supplied to inputs of N2 and N3 through a rectifier 201 bypassed by a filter capacitor 203.

The brush 192 is suspended from the disc 181 by an arm 211 which carries a brush 213, engaging a ring 215. The ring 215 is connected through the same conductor 240 to the input of N1, and is also adapted to be connected through the same conductor and, through contacts Re of Relay R, to N4.

The drive 39 includes a drum 221 on which the tape 41 is carried. The drum is connected directly to, or is driven through, gears from shaft 183.

When power is first applied to conductor 230 (FIG. 4) by power supply 23 in the absence of a card 55 in receptacle 53 current is transmitted from 230, through reset switch SWR, contact RDa of delay relay RD, arm 97, contact 107, arm 99, contact RDb of relay RD, the coil of relay RS, ground. RS is actuated opening contact RSa. This interrupts the current through the coil of RD. RD is actuated a short time interval after current is supplied to its coil so that it is not actuated before RS when power is first applied to 230. Contact RSb closes and energizes indicator 223.

This lamp indicates that the apparatus is in condition to receive a card 55 but has no card in the receptacle.

A card 55 is inserted in the receptacle 53 and the data of the transaction is set by wheels 59. When a card 55 is inserted in receptacle 53, contact 107 (FIG. 4) opens only if the card has one, and only one, hole in each position. Otherwise, indicator 223 remains energized and the attendant knows that the card is defective.

When 107 opens RS is deenergized; indicator 223 is deenergized. RD is energized through RSa opening RDa and RDb. Drive 35 is energized through RSa and Rf. The continuous tape 31 is advanced through a cycle. If tape 31 shows bad credit, indicator 151 is energized. In any event at the end of the cycle brushes 225 engage conductor 143. Relay R is energized in circuit 230, 225, 143, coil of R, ground. R is actuated and opens Rf and stops the drive 35. Relay R is locked in at contact Rg.

If indicator 151 is not energized recording start switch SWS is closed. The motor 185 is energized and locked in for one cycle by commutator 227. The commutator has a conducting segment 229 interrupted by an insulating strip (not shown) at the start. Conduction across SWS is established through the segment 229, brushes 231 and 233 and disc 235.

The transfer switch 37 is rotated and the drive 221 is advanced and the data of the transaction is recorded. At the same time a negative signal is impressed on N1 and N4 through conductor 240 (see page 10, lines 33, 34). If the transfer switch 37 is transmitting, a negative signal is also impressed on N2 and N3. The outputs of N2 and N4 are then zero and flip-flop F remains in its unflopped state so that there is no signal at the output of N6 and indicator 151 remains deenergized. If there is no signal through the amplifier 199 or through any contact 191, N2 receives no signal at its input, N5 receives a signal at the output of N2, N6 no signal at its input and F flops energizing indicator 151, to signal defective recording.

Following proper recording SWR is opened interrupting power to the apparatus, including checking network 33, and resetting the apparatus.

While a preferred embodiment of this invention has been disclosed herein, many modifications thereof are feasible. This invention is not to be restricted except insofar as is necessitated by the spirit of the prior art.

What is claimed is:

1. Apparatus for recording data of a credit transaction comprising a card identifying the creditor of the credit transaction and including sets of pairs of imprints, only one imprint at one time of each pair permitted to operate as a switch to close an electrical circuit, the said apparatus also including checking means having sets of pairs of imprints, each last-named set of imprints corresponding to, but complementary to, a set of imprints of said card, only one imprint at one time of each pair of imprints of said checking means, which pair of imprints is complementary to a corresponding pair of imprints on said card, being permitted to operate as a switch to close an electrical circuit, and an electrical circuit including an indicator and also including in series the switch of said card and the switch of said checking means so that said indicator is actuated on the closing of both said switches, the said apparatus also including additional switch means having a plurality of contacts, memory means including code means having means for receiving intelligence of items of data of said credit transaction, means, connected to said code means, for impressing on each of said contacts electrical impressions corresponding respectively to said items of said data, each said code means also having a series of numbers adapted to be reproduced by compression, each number corresponding to an item of said said data on said code means and being reproduceable from the code means when the corresponding item of data is set to be impressed on said contacts by said impressing means, a recording head, an additional contact connected to said head, means moving said additional switch means and said additional contact relative to each other so that said additional contact is sequentially engageable with said first-named contacts for transferring said impressions to said head, a moveable record connected to said head to receive said impressions from said head, and common drive means connected to said record and to said moving means for moving said record and moving means in synchronism.

2. The apparatus of claim 1 wherein the sets of pairs of imprints of the checking means are on a tape and wherein the checking means includes means for advancing the tape so that only one of a pair of said last-named sets of pairs of imprints are successively permitted to operate the switch to close the electrical circuit.

3. The apparatus of claim 1 wherein the code means is a code disc having pairs of conductors defining separate surface areas of said disc between them, means connected to one of the conductors of each pair for impressing a first electrical signal of one characteristic on said one conductor means connected to the other conductors of each pair for impressing on said other conductors a second electrical signal of another characteristic different from said one characteristic, conducting points in each said area connected selectively to one or the other conductor defining said area such that the points in said last-named area define a number in binary notation in terms of said first and second signals, the connection of said points being such that the numbers defined by points in successive areas are in increasing succession around the disc in one direction, a plurality of brushes corresponding to said points, and means for selectively connecting the points in any area to said brushes.

4. The apparatus of claim 3 wherein the code disc has impressed on its periphery a series of numbers adapted to be reproduced by compression, each number corresponding to a number defined by the points and the number corresponding to the points in each area being positioned for reproduction when the last-named points are in engagement with the brushes.

5. The apparatus of claim 3 wherein the successive areas are substantially sectors of the disc and the points extend radially in said sectors, each sector being defined by a pair of said conductors.

6. The apparatus of claim 1 wherein the record and the moving means are driven from a common shaft.

References Cited

UNITED STATES PATENTS

| | | | |
|---|---|---|---|
| 2,978,693 | 4/1961 | Champion | 340—347 |
| 3,056,956 | 10/1962 | Retzinger | 340—347 |
| 3,077,590 | 2/1963 | Loudon | 340—347 |
| 3,184,714 | 5/1065 | Brown | 340—149 |
| 2,976,104 | 3/1961 | Petersen | 346—33 |
| 3,168,268 | 2/1965 | Bossart | 246—2 |
| 3,021,059 | 2/1962 | Hammer. | |
| 3,124,674 | 3/1964 | Edwards et al. | 340—172.5 |
| 3,200,194 | 8/1965 | Rabinow | 340—172.5 |
| 3,344,258 | 9/1967 | Michels | 235—61.7 |

ROBERT C. BAILEY, Primary Examiner

HARVEY E. SPRINGBORN, Assistant Examiner

UNITED STATES PATENT OFFICE
CERTIFICATE OF CORRECTION

Patent No. 3,469,240  September 23, 1969

Arthur Ryden

It is certified that error appears in the above identified patent and that said Letters Patent are hereby corrected as shown below:

In the heading to the printed specification, lines 4 and 5, "assignor to Philip R. Dutch" should read -- assignor of fifty percent to Philip R. Dutch --.

Signed and sealed this 11th day of August 1970.

(SEAL)
Attest:

Edward M. Fletcher, Jr.
Attesting Officer

WILLIAM E. SCHUYLER, JR.
Commissioner of Patents